US 11,386,877 B2
Jul. 12, 2022

(12) United States Patent
Tanaka et al.

(54) AUDIO EQUIPMENT AND PROGRAM FOR AUDIO EQUIPMENT

(71) Applicant: AlphaTheta Corporation, Yokohama (JP)

(72) Inventors: Daisuke Tanaka, Yokohama (JP); Hitoshi Kudo, Yokohama (JP); Nao Takagi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 45 days.

(21) Appl. No.: 16/958,253

(22) PCT Filed: Dec. 29, 2017

(86) PCT No.: PCT/JP2017/047406
§ 371 (c)(1),
(2) Date: Jun. 26, 2020

(87) PCT Pub. No.: WO2019/130595
PCT Pub. Date: Jul. 4, 2019

(65) Prior Publication Data
US 2021/0074249 A1 Mar. 11, 2021

(51) Int. Cl.
G10H 1/00 (2006.01)

(52) U.S. Cl.
CPC ..... *G10H 1/0025* (2013.01); *G10H 2210/125* (2013.01); *G10H 2220/076* (2013.01); *G10H 2220/081* (2013.01)

(58) Field of Classification Search
CPC .......... G10H 1/0025; G10H 2210/125; G10H 2220/076; G10H 2220/081
USPC .......................................................... 84/601
See application file for complete search history.

(56) References Cited

U.S. PATENT DOCUMENTS

| 7,863,512 B2* | 1/2011 | Takeda | G10L 25/48 84/603 |
| 7,999,167 B2* | 8/2011 | Yoshikawa | G10H 1/0025 84/602 |
| 9,652,994 B1* | 5/2017 | Feng | G09B 15/023 |
| 10,496,199 B2* | 12/2019 | Mazur | G10H 1/0091 |
| 2001/0047717 A1* | 12/2001 | Aoki | H04M 19/041 84/611 |
| 2002/0172118 A1* | 11/2002 | Yamada | G10H 1/40 |
| 2005/0127309 A1* | 6/2005 | Spencer | G10H 1/0091 250/557 |
| 2006/0000345 A1* | 1/2006 | Yoshikawa | G10H 1/0041 84/616 |
| 2007/0227337 A1* | 10/2007 | Yoshikawa | G11B 27/034 84/602 |
| 2009/0223352 A1* | 9/2009 | Matsuda | G11B 27/005 84/612 |
| 2014/0260912 A1* | 9/2014 | Maezawa | G10H 1/40 84/612 |

(Continued)

FOREIGN PATENT DOCUMENTS

| JP | H07-199918 A | 8/1995 |
| JP | H07199918 A * | 8/1995 |

(Continued)

OTHER PUBLICATIONS

International Preliminary Report on Patentability dated Jul. 9, 2020, 6 pages.

(Continued)

*Primary Examiner* — Christina M Schreiber
(74) *Attorney, Agent, or Firm* — Rankin, Hill & Clark LLP

(57) ABSTRACT

Sound equipment includes: a beat position acquiring unit configured to analyze a beat position of music piece data to be reproduced or acquire an analysis result; and a beat position displaying unit configured to display a scale of a differential numerical value of the number of beats in a plus direction and a minus direction of the music piece data with reference to a currently reproduced position of the music piece data.

5 Claims, 4 Drawing Sheets

(56) References Cited

U.S. PATENT DOCUMENTS

| | | | | | |
|---|---|---|---|---|---|
| 2014/0366709 | A1* | 12/2014 | Uemura | ................ | G09B 5/06 |
| | | | | | 84/603 |
| 2016/0189699 | A1* | 6/2016 | Garet | .................. | H04H 60/04 |
| | | | | | 345/184 |
| 2020/0335075 | A1* | 10/2020 | Takagi | ................... | G10H 1/40 |
| 2021/0074249 | A1* | 3/2021 | Tanaka | ................... | G10H 1/40 |

FOREIGN PATENT DOCUMENTS

| | | | | |
|---|---|---|---|---|
| JP | 2002-091290 | | 3/2002 | |
| JP | 3743280 B2 | * | 2/2006 | |
| JP | 2006-119512 A | | 5/2006 | |
| JP | 3870657 B2 | * | 1/2007 | |
| JP | 4348391 | | 10/2009 | |
| JP | 4348391 B2 | * | 10/2009 | ............ G11B 27/34 |
| JP | 2015-149115 | | 8/2015 | |
| WO | 2013/030862 | | 3/2013 | |
| WO | 2013/030863 | | 3/2013 | |
| WO | WO-2013030862 A1 | * | 3/2013 | ............... G10G 1/00 |

OTHER PUBLICATIONS

International Search Report, dated Jun. 3, 2018, 1 page.
Japanese Office Action with English translation dated Oct. 19, 2021, 6 pages.
Japanese Notice of Allowance dated Apr. 12, 2022, Application No. 2019-562715, 1 page; partial English translation included.

* cited by examiner

AUDIO EQUIPMENT AND PROGRAM FOR AUDIO EQUIPMENT

TECHNICAL FIELD

The present invention relates to sound equipment and a sound equipment program.

BACKGROUND ART

Typical sound equipment such as a DJ controller is connected to a computer to reproduce digital music piece data in MP3 format or the like using application software run on the computer.

In this regard, a display of the computer and a display of the DJ controller show a state of progress of the music piece data to be reproduced and information of the music piece data to be reproduced, such as a BPM (Beats Per Minute) value and an elapsed time of reproduction, and an operator does DJ performance while looking at an image appearing on the displays.

For instance, Patent Literature 1 discloses a technology where a reproduction time of a single music piece in audio signal is acquired, the number of beats and the number of bars per unit of time are detected, and the number of bars and the number of beats, which indicate a state of progress of reproduction of the audio signal, are displayed on a display respectively in a horizontal direction and a vertical direction.

CITATION LIST

Patent Literature(S)

Patent Literature 1: JP 4348391 B

SUMMARY OF THE INVENTION

Problem(s) to be Solved by the Invention

However, according to the technology described in Patent Literature 1, visibility to an operator is reduced with a size reduction of a display, making the state of reproduction of the music piece less seeable, although the visibility to the operator can be ensured as long as the display is sufficiently large.

An object of the invention is to provide sound equipment and a sound equipment program configured to make it easy for an operator to see a state of progress of a currently reproduced music piece.

Means for Solving the Problem(s)

According to an aspect of the invention, sound equipment includes: a beat position acquiring unit configured to analyze a beat position of music piece data to be reproduced or acquire an analysis result; and a beat position displaying unit configured to display a scale of a differential numerical value of the number of beats in a plus direction and a minus direction of the music piece data with reference to a currently reproduced position of the music piece data.

According to another aspect of the invention, a sound equipment program is configured to enable a computer to function as the sound equipment according to the above aspect of the invention.

BRIEF DESCRIPTION OF DRAWING(S)

DESCRIPTION OF EMBODIMENT(S)

[1] Overall Configuration

Figure 1:
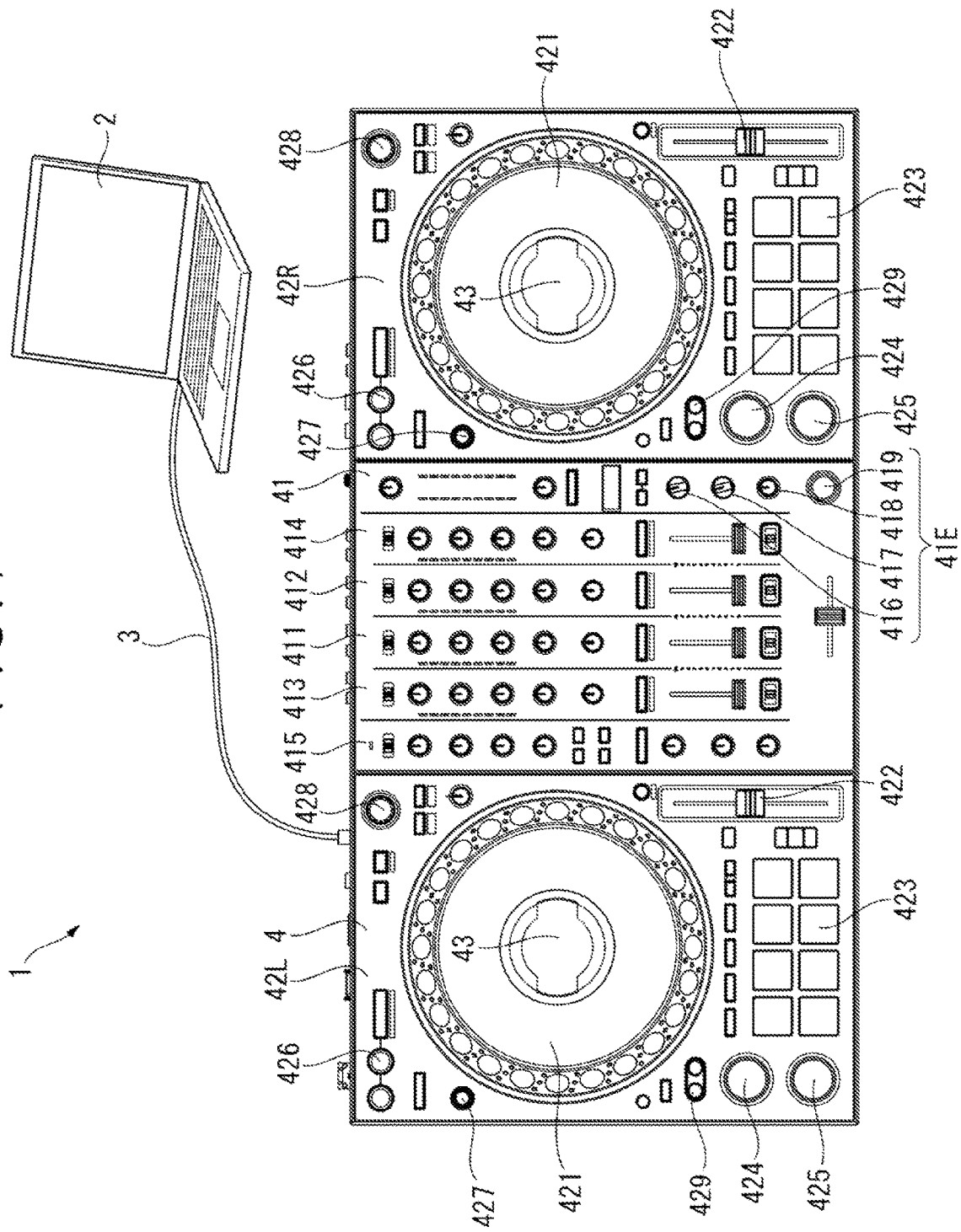
FIG. 1 is a schematic view showing a music piece data reproduction control system according to an exemplary embodiment of the invention.

An exemplary embodiment of the invention will be described below with reference to the attached drawings. FIG. 1 shows a music piece reproduction control system 1 according to the exemplary embodiment of the invention, the music piece data reproduction control system 1 including a computer 2 and a DJ controller 4 connected to the computer 2 through a USB cable 3.

The computer 2, which includes a storage such as CPU and a hard disk, is configured to reproduce music piece data stored in MP3 format or the like in the storage. The music piece data is reproduced by application software run on the CPU and the reproduced music piece data is outputted to the DJ controller 4 through the USB cable 3. Further, a reproduction control signal generated by operating a mixer 41 and decks 42L and 42R of the DJ controller 4 is outputted to the USB cable 3 to be inputted to the computer 2. In the computer 2, a variety of sound effects are added to the currently reproduced music piece data in accordance with the reproduction control signal outputted from the DJ controller 4.

The DJ controller 4, which is an example of sound equipment, includes the mixer 41 located at a center thereof and the decks 42L and 42R located at right and left of the mixer 41. It should be noted that the sound equipment according to the invention refers to a concept including not only sound reproduction controller as in the exemplary embodiment but also a sound reproducer configured to reproduce music piece data.

The mixer 41, which is a section configured to switch audio data outputted from the computer 2, adjust sound volumes of channels, and add a sound effect, includes first channel adjuster 411 to fourth channel adjuster 414 and a microphone adjuster 415.

An effector 41E is provided at a lower right of the mixer 41. In order to add a sound effect to a music piece to be reproduced, the effector 41E includes an effect selection switch 416, a channel selection switch 417, an effect-amount adjusting switch 418, and an effect adding switch 419.

The decks 42L and 42R are sections configured to be operated by an operator to add a variety of effects to music piece data outputted from the computer 2. The decks 42L and 42R each include a jog dial 421, a tempo slider 422, a performance pad 423, a cue button 424, a play/pause button 425, a loop button 426, a deck selection button 427, a load button 428, and a cue/loop call switch 429.

The jog dial 421, which is an example of a rotary operation unit, is rotatably provided to a device body of each of the decks 42L and 42R, is configured to fast-forward and reverse music piece data to be reproduced when the operator rotates the jog dial 421.

A display 43, which includes a liquid crystal display, is provided at a center of the jog dial 421. As described later in detail, a BPM (Beats Per Minute) value, an elapsed time, a state of progress, and a beat position of the currently reproduced music piece data and a state of rotation of an LP record at 33 RPM in line with the progress of the currently reproduced music piece data are displayed on the display 43, allowing the operator to see the progress of the reproduction of the music piece data.

The tempo slider 422 is a switch for adjusting a tempo of music piece data to be reproduced. The performance pad 423, which is a button for switching an effect for the currently reproduced music piece data, is configured to add effects, such as loop, cue, key shift, and sampler, to the currently reproduced music piece data instantaneously when pressed by the operator.

The cue button 424 is a button for cuing a music piece to be reproduced.

The play/pause button 425 is a button for starting reproduction of music piece data and pausing the currently reproduced music piece data. The loop button 426 is a button for looping the currently reproduced music piece data.

The deck selection button 427 is a button for selecting which one of the first channel adjuster 411 to the fourth channel adjuster 414 of the mixer 41 is to be used for operating the currently reproduced music piece data. In the exemplary embodiment, the left deck 42L is configured to switch between the first channel adjuster 411 and the third channel adjuster 413 and the right deck 42R is configured to switch between the second channel adjuster 412 and the fourth channel adjuster 414.

The cue/loop call switch 429 is a switch for calling a stored cue point.

The load button 428 is a button for loading music piece data from the computer 2. By pressing the load button 428 after music piece data to be reproduced is selected on the computer 2, the music piece data is loaded to a channel of one of the first channel adjuster 411 to the fourth channel adjuster 414.

[2] Display Mode of Display 43

The decks 42L and 42R of such a DJ controller 4 are each provided with the display 43. The display 43 is located at a rotation center of the jog dial 421.

The display 43 in a form of a liquid crystal display has a layered structure of a backlight, a liquid crystal panel, and a color filter.

Figure 2:
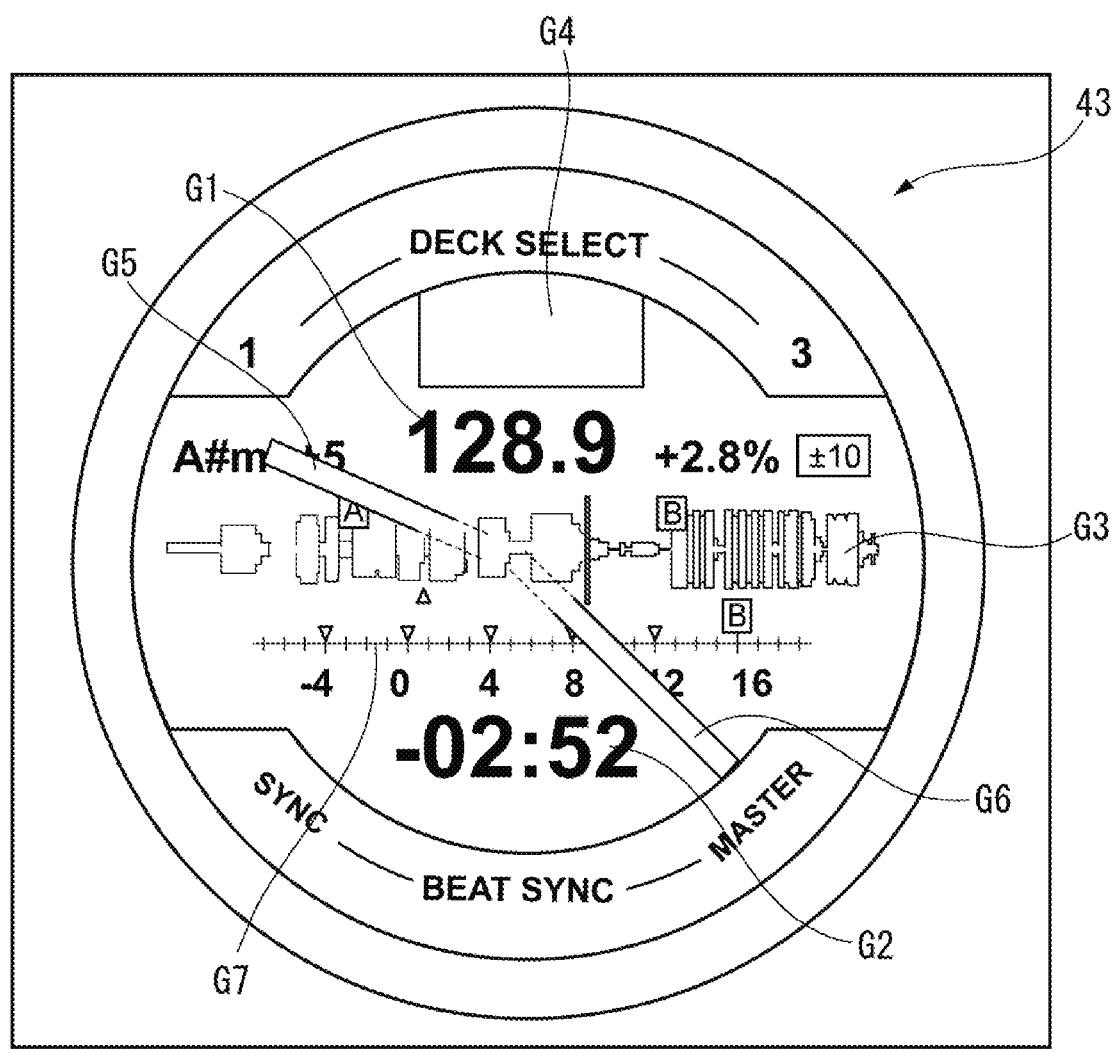
FIG. 2 is a schematic view showing a display mode displayed on a display according to the exemplary embodiment.

As shown in FIG. 2, information regarding the currently reproduced music piece data is displayed on the display 43. Specifically, a BPM image (Beats Per Minute) G1 of the currently reproduced music piece data, an elapsed time image G2 of the currently reproduced music piece data, an image G3 regarding the state of progress of the currently reproduced music piece data, a jacket image G4 contained in the music piece data, etc. are displayed on the display 43.

In addition, a rotary display image G5 is displayed on the display 43, rotating at a speed similar to 33 RPM, that is, a rotation speed of the LP record, during the reproduction of the music piece data. When the jog dial 421 is operated, the rotary display image G5 also follows with a displayed position thereof displaced in accordance with an operation amount. Further, a marker image G6 is displayed on the display 43, allowing the operator to see a position of a cue point or the like by setting a position of the marker image G6 at a desired position.

In the exemplary embodiment, a beat position display image G7 is displayed under the image regarding the state of progress of the currently reproduced music piece data, showing a scale of differential numerical values of the number of beats in a plus direction and a minus direction of the music piece data with reference to a currently reproduced position in the music piece data to be reproduced.

Figure 3:
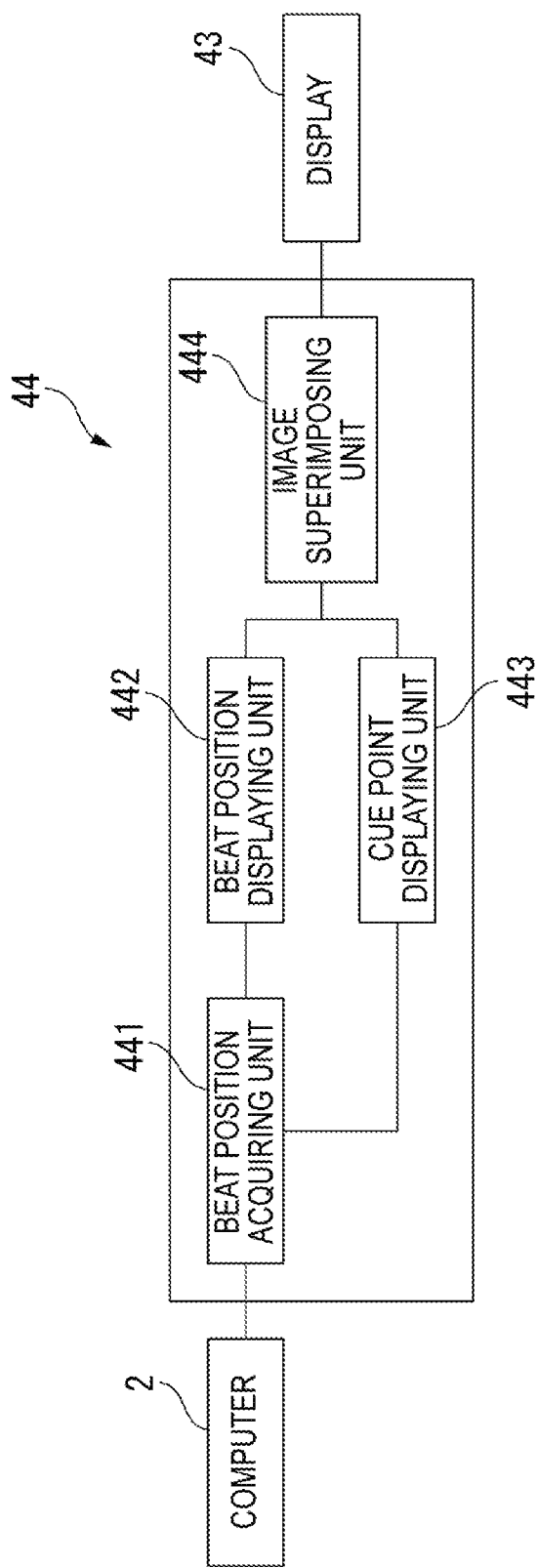
FIG. 3 is a block diagram showing a controller configured to perform a display control of the display according to the exemplary embodiment.

Such a display mode of the display 43 is displayed by a controller 44 in the DJ controller 4, which is shown in a functional block diagram of FIG. 3.

The controller 44 includes a beat position acquiring unit 441, a beat position displaying unit 442, a cue point displaying unit 443, and an image superimposing unit 444, which constitute a sound equipment program.

The beat position acquiring unit 441 is configured to acquire a beat position in the music piece data to be reproduced by the computer 2. In order to acquire the beat position, an analysis result analyzed by the application software run on the CPU of the computer 2 may be acquired, or the beat position acquiring unit 441 may acquire the beat position by analyzing the inputted music piece data.

Figure 4:
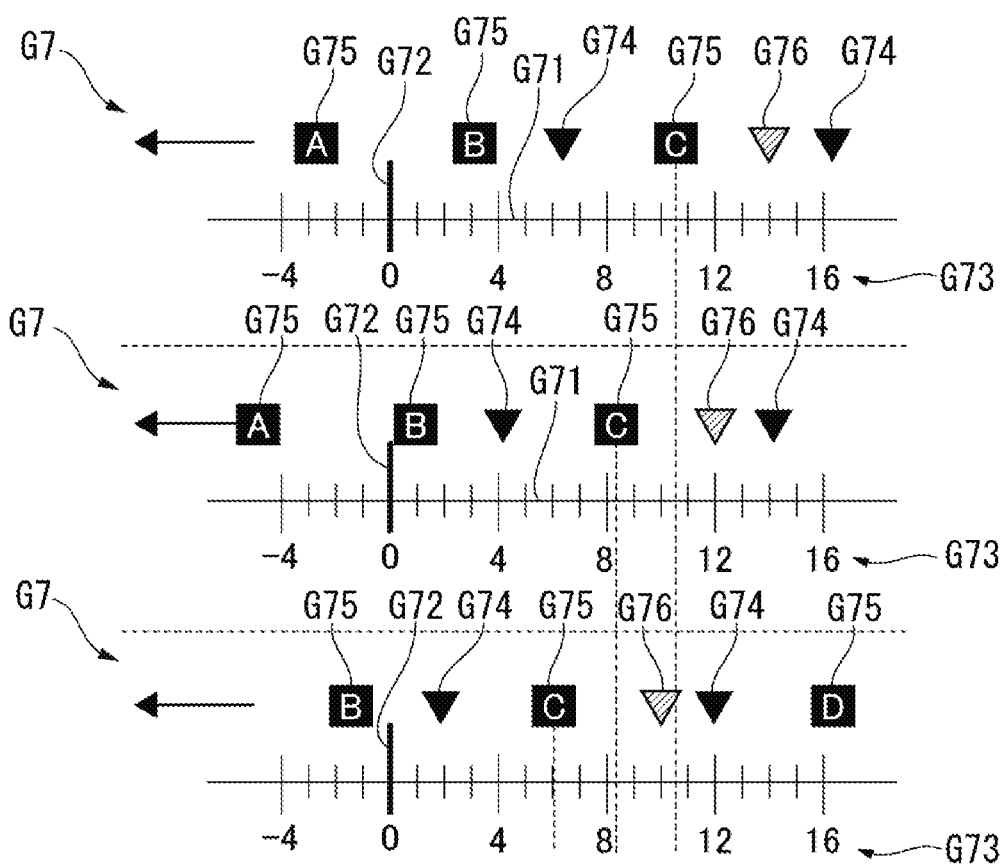
FIG. 4 is a schematic view for explaining an operation according to the exemplary embodiment.

The beat position displaying unit 442 is configured to generate the beat position display image G7 to be displayed on the display 43. Specifically, the beat position displaying unit 442 is configured to generate an image including a horizontal line image G71 marked with a scale and superimpose an elongated vertical line image G72 on the horizontal line image G71 as shown in FIG. 4.

A position of the vertical line image G72 is displayed as a reference, that is, the currently reproduced position in the music piece data, while a scale image G73 of the differential numerical values of the number of beats, which may be the number of bars in the exemplary embodiment, is displayed under the horizontal line image G71, showing zero at the current position of the vertical line image G72. Specifically, in the exemplary embodiment, the beat position displaying unit 442 is configured to display the scale image G73 showing a scale with numerical values for 4 bars marked in the minus direction and numerical values for 16 bars marked in the plus direction with respect to the currently reproduced position.

The beat position displaying unit 442 is also configured to superimpose a beat position image G74 on the scale image G73 for display.

The cue point displaying unit 443 is configured to display a cue point, at which a desired temporal position in the currently reproduced music piece data is registered, in a manner to be superimposed on the scale image G73, The cue point displaying unit 443 is configured to distinctively display two types of cue points.

Specific examples are a hot cue point and a memory cue point. The hot cue point refers to a reproduction start temporal position where a temporal position for starting reproducing the music piece data is registered. The memory cue point refers to a retrieved temporal position where a temporal position for retrieving the music piece data is registered. The hot cue point is provided to reproduce the music piece data after jump to the reproduction start position from a position where the hot cue is called, immediately when the hot cue is called using the performance pad 423. Meanwhile, the memory cue point, which is stored as the retrieving position, is provided to stop the reproduction after jump to the reproduction start position when called using the cue/loop call switch 429 and start the reproduction when the operator presses the play/pause button 425.

The cue point displaying unit 443 is configured to superimpose and display a hot cue point image G75 and a memory cue point image G76 on an upper portion of the beat position display image G7 displayed by the beat position displaying unit 442 as shown in FIG. 4. It should be noted that in a case where the hot cue point and the memory cue point positionally overlap, the cue point displaying unit 443 is configured to display the hot cue point image G75 in a foreground and display the memory cue point image G76 therebehind.

The image superimposing unit 444 is configured to display not only the beat position display image G7 generated by the beat position displaying unit 442 and the hot cue point image G75 and the memory cue point image G76 generated by the cue point displaying unit 443 but also the BPM image G1, the elapsed time image G2 of the music piece data, the image G3 regarding the state of progress of the music piece data, the rotary display image G5, and the marker image G6 described above in a superimposed manner on the display 43.

[3] Operations and Effects of Exemplary Embodiment

In such an exemplary embodiment, the beat position display image G7 and the scale image G73 are each fixedly displayed at a predetermined position on the display 43 as shown in FIG. 4. As the music piece data progresses, the beat position image G74, the hot cue point image G75, and the memory cue point image G76 move leftward in accordance with the progress of the music piece.

This allows the operator to visually recognize the currently reproduced position and the beat positions before and after the currently reproduced position in the music piece data on the simple beat position display image G7, so that the operator can easily visually check the state of progress of the currently reproduced music piece.

Further, since the beat position display image G7 is configured to display the beat positions not only in the plus direction but also in the minus direction, it is possible to do DJ performance while checking an already reproduced cue point, etc. in the beat position display image G7 even during reverse reproduction such as a scratch operation with the DJ controller 4. The user-friendliness of the DJ controller 4 can thus be improved.

The cue point images G75 and G76 are superimposed and displayed on the beat position display image G7, making it easy to visually check at which position the cue point is set in accordance with the reproduced position in the music piece data. The operator can thus easily recognize the cue point position in the music piece data with an improved user-friendliness.

Since the scale image G73 of the differential numerical values of the number of beats is displayed on a bar basis, the number of long bars can be displayed short in length to further improve visibility to the operator.

[4] Modifications of Exemplary Embodiment

It should be noted that the invention is not limited to the above exemplary embodiment and the following modifications fall within the scope of the invention.

In the beat position display image G7 according to the above exemplary embodiment, the scale image G73 is displayed as the numerical values on the bar basis; however, the invention is not limited thereto. For instance, a scale image in the beat position display image G7 may show the number of beats while a scale image of the differential numerical values may be displayed as −16 beats, 0 beats, 16 beats, 32 beats, 48 beats, and 64 beats.

Further, the above beat position display image G7 shows the beat positions for 4 bars in the minus direction and for 16 bars in the plus direction; however, the invention is not limited thereto. For instance, the beat positions for 8 bars may be displayed in the minus direction while the beat positions for 8 bars may be displayed in the plus direction, or the beat positions displayed in the plus direction and the minus direction may be set as desired.

In addition, regarding a specific structure, shape, etc. for implementation of the invention, any other structure, etc. may be employed as long as an object of the invention is achievable.

The invention claimed is:

1. Sound equipment comprising:
   a beat position acquiring unit configured to analyze a beat position of music piece data to be reproduced or acquire an analysis result; and
   a beat position displaying unit configured to display a differential numerical value of the number of beats on a fixed scale in a plus direction and a minus direction of the music piece data with reference to a currently reproduced position of the music piece data, wherein the fixed scale is a linear scale.

2. The sound equipment according to claim 1, further comprising:
   a cue point displaying unit configured to display a cue point where a desired temporal position in the music piece data is registered in a manner to be superimposed on the scale.

3. The sound equipment according to claim 2, wherein the cue point displaying unit is configured to distinctively display a reproduction start temporal position where a temporal position of start of reproduction of the music piece data is registered and a retrieved temporal position where a retrieved temporal position in the music piece data is registered.

4. The sound equipment according to claim 1, wherein the beat position displaying unit is configured to display the differential numerical value of the number of beats on the scale with a bar basis.

5. A non-transitory computer-readable recording medium recording a sound equipment program configured to enable a computer to function as the sound equipment according to claim 1.

* * * * *